United States Patent

[11] 3,590,424

[72] Inventor Ralph T. Shults
      Hettinger, N. Dak. 58639
[21] Appl. No. 746,022
[22] Filed July 19, 1968
[45] Patented July 6, 1971

[54] FISH SCALING DEVICE
     2 Claims, 6 Drawing Figs.
[52] U.S. Cl. .................................................. 17/67
[51] Int. Cl. ............................................. A22c 25/02
[50] Field of Search ................................. 17/66, 67, 64

[56] References Cited
     UNITED STATES PATENTS
1,324,581  12/1919  Boesch et al. .................. 17/67
2,557,272   6/1951  Gabriel ........................... 17/67

Primary Examiner—Lucie H. Laudenslager
Attorney—Robert E. Kleve

ABSTRACT: The invention comprises a fish scaler which is power operated and includes a handle, a shaft rotatably mounted to one end of the handle, a sleeve fixed to said one end of said handle and covering an inner portion of the shaft, three elongated blades fixed to the outer end of said shaft beyond said sleeve, three elongated rods spaced equidistantly and radially about said shaft and having their inner ends extending toward and mounted to said sleeve and having their central portion extending across the blades and spaced radially beyond the outer edges of said blades, a nose cone rotatably mounted to the outer end of said shaft, said rods having their outer ends fixed to said nose cone whereby said nose cone remains fixed relative to the rotation of said shaft.

PATENTED JUL 6 1971 3,590,424

INVENTOR
Ralph T. Shults
BY Robert E. Kleve
ATTORNEY

FISH SCALING DEVICE

This invention relates to fish scaling equipment, more particularly, the invention relates to power operated fish scaling equipment.

It is an object of the invention to provide a novel power operated fish scaling device which can be applied against the sides of a fish to remove the scales and which can be operated without the scales clogging in the device and interfering with the operation.

It is a further object of the invention to provide a novel fish scaling device which will cut into the sides of a fish only to a predetermined level so as to prevent the device from cutting into the flesh of the fish when removing the scales.

It is a further object of the invention to provide a novel fish scaling device which can be rotated to any of three different positions for engaging the fish to remove the scales.

Further objects and advantages of the invention will become apparent as the description proceeds and when taken in conjunction with the accompanying drawings wherein.

Briefly stated, the invention comprises a power operated fish scaler, having a handle, an elongated shaft rotatably mounted to one end of the handle, a sleeve fixed to said one end of said handle and covering the inner portion of said shaft, three elongated blades fixed to the outer end of said shaft beyond said sleeve, three elongated rods spaced equidistantly and radially about said shaft and having their inner ends extending toward and mounted to said sleeve and having their central portion extending across the blades and spaced radially beyond the outer edges of said blades, a nose cone rotatably mounted to the outer end of said shaft, said rods having their outer ends fixed to said nose cone, whereby said nose cone remains fixed relative to the rotation of said shaft.

Figure 1:
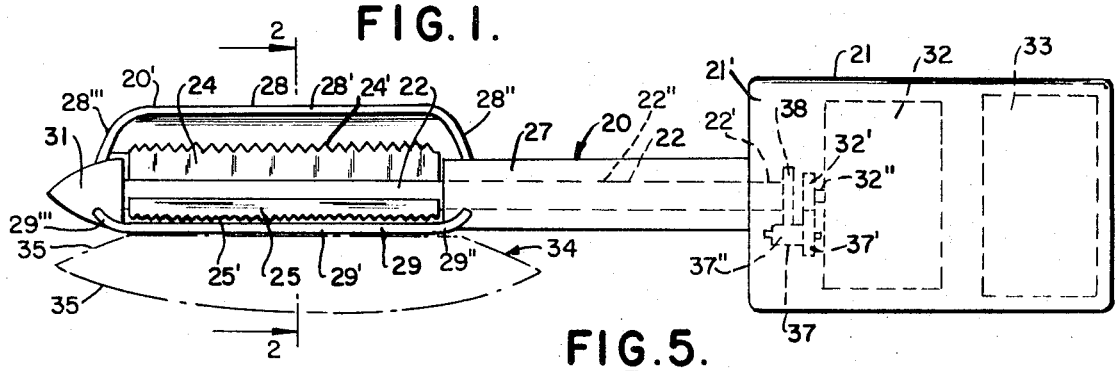
FIG. 1 is a side elevational view of the power operated fish scaling invention.

Referring more particularly, to the drawing in FIG. 1, the fish scaling device 20 is illustrated having a handle 21 with a shaft 22 rotatably mounted at one end 22' in the end 21' of the handle 21. The shaft 22 has three identical blades 24, 25, and 26 fixed to the outer end of the shaft 22''' at locations 120° from one another about the shaft. A sleeve 27 is fixed to end 21' of the handle 21 and covers the inner portion 22'' of the shaft. The outermost end 22'''' of the shaft 22 is rotatably mounted in a nose cone or bearing member 31. Three elongated steel rods 28, 29 and 30 are spaced equidistantly about the longitudinal axis of the shaft 22 and have straight central portions 28', 29' and 30' extending longitudinally and in parallelism with the length of the blades and spaced radially beyond the outer cutting edges 24', 25' and 26' of the blades, so that the blades 24, 25 and 26, when rotated by the shaft, will clear the rods.

The rods 28, 29 and 30 have their inner ends 28'', 29'' and 30'' bent toward and fixed to the sleeve 27, and their outer ends 28''', 29''' and 30''' bent toward and fixed to the nose cone, whereby the shaft 22 and blades 24, 25 and 26 may rotate relative to the handle 21, the sleeve 27, rods 28, 29 and 30 and nose cone 31.

The shaft 22 and blades 24, 25 and 26 are powered by motor 32 in the handle, and the motor 32 is in turn powered by conventional batteries 33. The motor 32 has a gear 32' fixed to the outer end of the motor shaft 32''. The gear 32' rotatably drives gear 37, by driving the enlarged annular gear portion 37' and the smaller annular gear portion 37'', arranged coaxially with the larger gear portion 37', drives a gear 38, which gear 38 is fixed coaxially to the end 22' of the shaft 22, thereby rotating the shaft 22.

The fish scaling device 20 is used to clean scales from the sides of a fish as illustrated FIG. 1. The fish is illustrated in cross section laterally of its length by phantom lines 34, with forward end of the device 20' being applied against the sides 35 of the fish. The blades 24, 25 and 26 will rotate cutting into the sides of the fish and remove the scales, the area about the blades 24, 25 and 26 being open, allows the scales to be thrown free of the device and not clog into portions of the device.

The guard rails 28, 29 and 30 also act as a limit to limit the depth of the cut or depth of penetration of the blades into the fish, so that the blades will only cut into the scales of the fish, and prevent the blades from cutting deeper into the flesh of the fish.

Figure 4:
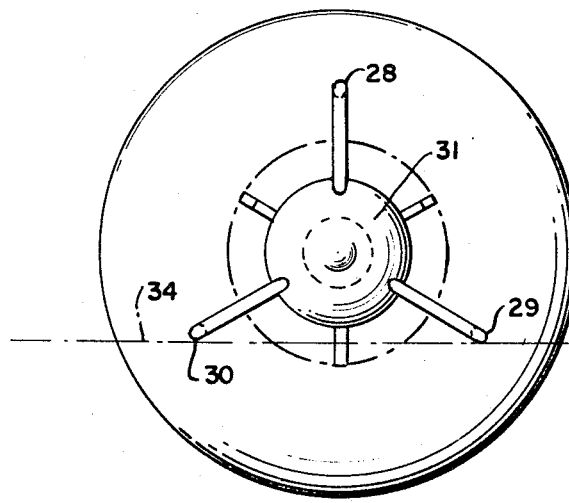
FIG. 4 is an enlarged end view of the fish scaling invention.

In FIG. 4, the fish scaling device is shown with the guard rails 29 and 30 acting to limit the depth of cut of the blades 24, 25 and 26, into the fish 34, however, the device may be rotated 120° in either direction and applied in the same manner, to the fish thereby employing either guard rails 28 and 30 together to limit the cut, or employ guard rails 28 and 29 to limit the depth of the cut.

Figures 2, 5, 6:
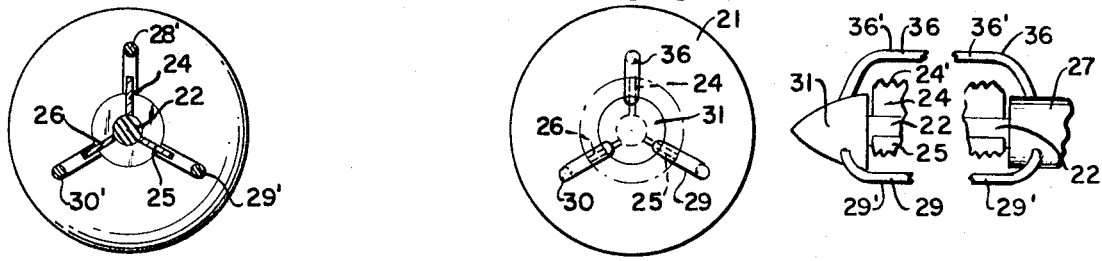
FIG. 2 is an cross-sectional view of the fish scaling invention taken along line 2–2 of FIG. 1.
FIG. 5 is an end view of a modified form of the invention.
FIG. 6 is a fragmentary side elevational view of the modified form of the invention.
Figure 3:
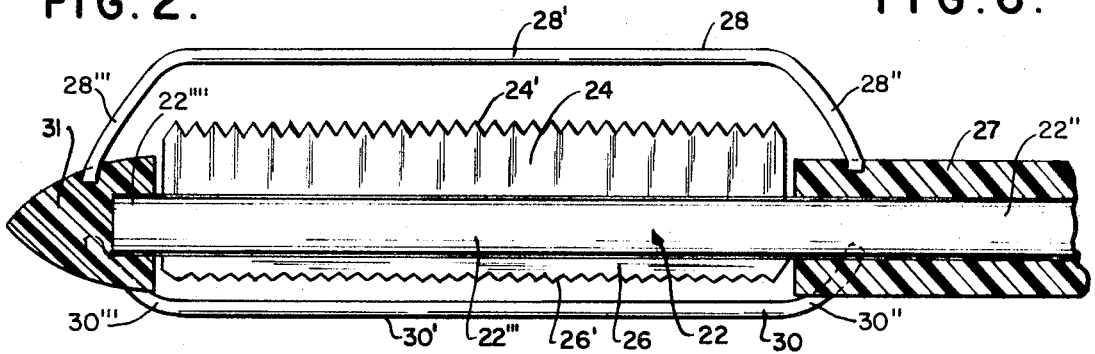
FIG. 3 is an enlarged longitudinal cutaway fragmentary view of the fish scaling invention.

The guard rail 28 may be made as illustrated in FIGS. 5 and 6 and designated as numeral 36, so that its straight portion 36' is spaced a shorter distance from the center axis of the shaft 22, than rails 29 and 30. The distance of the rail 36, away from the outer edges of the cutting edges of the blades and center axis of the shaft as illustrated in FIGS. 5 and 6, will be less than the distance between the cutting edges and the rails 29 and 30, when the blades are in alignment. Consequently, when the device 20 is applied against the fish, with the rails 29 and 30 used to limit the depth of the cut, the cut or depth of penetration of the blades into the fish will be less than when either guard rails 36 and 29 are used together, or guard rails 36 and 30 are used together. Thus, since the scales on some fish are thicker than on others, one may have a choice between two different depths of cut.

Thus, it will be seen from the foregoing that a novel effective fish scaling device has been provided which may be used continually without clogging the fish scaler, and which will cut into the side of the fish to a predetermined level.

It will be obvious that various changes and departures may be made to the invention without departing from the spirit and scope thereof and accordingly it is not intended that the invention be limited to that specifically described in the specification or as illustrated in the drawings but only as set forth in the appended claims.

I claim:

1. A fish scaler comprising a handle, an elongated shaft rotatably mounted to and extending from one end of the handle, a bearing member rotatably mounted to the outer end of the shaft, a plurality of elongated rails having their intermediate portions extending parallel to the longitudinal axis of the shaft and spaced outwardly therefrom and each having their one ends bent laterally with respect to their intermediate portions and converging toward and fixed to said bearing member and their other ends projecting toward and fixed relative to said, one end of said handle a plurality of cutting blades fixed to said shaft at intervals about the longitudinal axis of the shaft and said blades having cutting surfaces projecting radially outward beyond the radial outer surface of the bearing member and terminating a radial distance less than the radius of the inner surface of the intermediate portions of the rails, whereby the scaler may be applied to the side of a fish to be scaled with the intermediate portions of any two of the rails engaging the side of the fish and limiting the depth of cut of the blades against the fish, the said scaler being open between each of said rails whereby any fish scales cut from the fish by the blades may be projected by the blades out past the laterally bent ends and intermediate portions of the rails.

2. A fish scaler according to claim 1 wherein said plurality of rails comprises three rails spaced 120° from one another about the longitudinal axis of the shaft, with, one of the rails having its intermediate portion spaced a shorter radial distance from the longitudinal axis of the shaft than intermediate portions of the other two rails, so that when one of the engaging rails is applied to the side of the fish which is the said shorter rail, the blade will be closer to the side of the fish to provide a deeper cut than when the longer two rails are the two engaging rails, to thereby vary the cut of the blade with respect to the fish